(12) United States Patent
Chen et al.

(10) Patent No.: US 10,150,883 B2
(45) Date of Patent: Dec. 11, 2018

(54) UV-CURABLE COATING COMPOSITIONS AND METHODS FOR USING THEM

(71) Applicant: PPG COATINGS (TIANJIN) CO., LTD., Tianjin (CN)

(72) Inventors: Qiang Chen, Tianjin (CN); Zhenhua Wen, Suzhou (CN)

(73) Assignee: PPG Coatings (Tianjin) Co., Ltd., Tianjin (CN)

( * ) Notice: Subject to any disclaimer, the term of this patent is extended or adjusted under 35 U.S.C. 154(b) by 0 days.

(21) Appl. No.: 14/916,780

(22) PCT Filed: Sep. 4, 2013

(86) PCT No.: PCT/CN2013/082894
§ 371 (c)(1),
(2) Date: Mar. 4, 2016

(87) PCT Pub. No.: WO2015/032034
PCT Pub. Date: Mar. 12, 2015

(65) Prior Publication Data
US 2016/0215161 A1    Jul. 28, 2016

(51) Int. Cl.
*C09D 133/14* (2006.01)
*C09D 175/14* (2006.01)
*C09D 175/16* (2006.01)

(52) U.S. Cl.
CPC ......... *C09D 133/14* (2013.01); *C09D 175/14* (2013.01); *C09D 175/16* (2013.01)

(58) Field of Classification Search
CPC ... C09D 133/14; C09D 175/14; C09D 175/16
See application file for complete search history.

(56) References Cited

U.S. PATENT DOCUMENTS

| | | | |
|---|---|---|---|
| 5,187,199 A * | 2/1993 | Sudo | C08G 18/4063 523/500 |
| 6,150,430 A | 11/2000 | Walters et al. | |
| 6,207,118 B1 * | 3/2001 | Gaven | B05D 3/067 250/504 R |
| 2002/0193526 A1 * | 12/2002 | Adachi | B05D 5/068 525/214 |
| 2008/0257216 A1 | 10/2008 | Ravyst | |
| 2008/0286592 A1 | 11/2008 | Smelyansky et al. | |
| 2010/0243458 A1 * | 9/2010 | Kojima | B29C 33/38 205/50 |
| 2012/0059080 A1 * | 3/2012 | Fukushima | C09D 183/06 522/64 |
| 2012/0148848 A1 * | 6/2012 | Martin | B05D 5/067 428/421 |
| 2016/0145449 A1 * | 5/2016 | Hilgers | C09D 4/06 428/327 |

FOREIGN PATENT DOCUMENTS

| | | |
|---|---|---|
| CN | 1696225 A | 11/2005 |
| CN | 101358048 A | 2/2009 |
| CN | 101463222 A | 6/2009 |
| CN | 102134437 A | 7/2011 |
| CN | 102250543 A | 11/2011 |
| CN | 102391776 A | 3/2012 |
| CN | 103249498 A | 8/2013 |
| EP | 1170342 A1 | 1/2002 |
| EP | 1743909 A1 | 1/2007 |
| EP | 1914253 A2 | 4/2008 |
| WO | 02070616 A1 | 9/2002 |
| WO | 2014070596 A1 | 5/2014 |
| WO | 2014118251 A1 | 8/2014 |

* cited by examiner

*Primary Examiner* — Shamim Ahmed
*Assistant Examiner* — Bradford M Gates
(74) *Attorney, Agent, or Firm* — Justin Martinchek

(57) ABSTRACT

Disclosed is a coating composition comprising: (a) a functional urethane acrylate; (b) a photoinitiator; (c) an organic solvent; and (d) a modified functional urethane acrylate, and the method for applying said coating composition. The disclosed coating composition may have both excellent rheology properties and excellent gloss properties in the resulting film.

17 Claims, No Drawings

UV-CURABLE COATING COMPOSITIONS AND METHODS FOR USING THEM

FIELD OF THE INVENTION

The present invention relates to coating compositions and methods for using the same, and more particularly to UV-curable coating compositions and methods for using the same. The present invention also relates to the use of a modified functional urethane acrylate in improving rheology of coating composition while maintaining one or more gloss properties of the resulting coating.

BACKGROUND INFORMATION

UV-curable coatings are currently extensively used in many industries. Particular applications include surface coating treatments in furniture, flooring, and consumer electronics. In particular, UV-curable coatings are specifically used in consumer electronics for creating a clear and high gloss surface on an electronic product.

However, current techniques used in the coating on an electronic product have the following drawbacks. The high flowability of some coatings results in coated substrates having "picture frame" effects, i.e., thick at the edge and thin in the center, looking like a frame.

There are several attempts to solve the above-identified problems. One is to increase the molecular weight of the main resin(s) in the coating so as to decrease the flowability of the resins. Another is to use highly volatile diluents so as to decrease the flowability of wet films. However, both methods have not solved the problems with complete satisfaction. Although sometimes picture framing effects are decreased, the leveling property of the coat film is unacceptable.

Hence, it is still a longer term demand in the art to provide a UV-curable coating composition having both appropriate flowability and good mirror surface effects in the resulting coating, so as to be used in applications requiring high leveling property.

SUMMARY OF THE INVENTION

After comprehensive studies and experiments, the present inventors have found that a combination between a functional polyurethane acrylate with a modified functional urethane acrylate can provide desired flowability while resulting in acceptable, if not excellent, mirror surface effects and, therefore, accomplished the present invention. As used herein and appreciated by a person skilled in the art, the term "mirror surface effect" is an effect of the coated surface which is "as flat as mirror surface".

In one embodiment of the present invention, the present invention relates to a coating composition comprising:
 (a) a functional urethane acrylate;
 (b) a photoinitiator;
 (c) an organic solvent; and
 (d) a modified functional urethane acrylate.

In another embodiment of the present invention, the present invention relates to a method for forming a coating on a plastic substrate with a coating composition, wherein the coating compositing comprises:
 (a) a functional urethane acrylate;
 (b) a photoinitiator;
 (c) an organic solvent; and
 (d) a modified functional urethane acrylate, and
wherein the method comprises:
 (i) applying said coating composition to at least a part of a plastic substrate;
 (ii) adjusting the thickness of the coating applied to obtain a dry film thickness of 10 to 25 micrometers;
 (iii) baking the coating; and
 (iv) UV radiating the coating composition at a strength and time to effect cure.

In certain embodiments, the coating may be mixed with one or more diluents to obtain a diluted or less viscous coating composition, and it is this coating composition that is applied to the substrate.

In a further embodiment of the present invention, the present invention relates to the use of a modified functional urethane acrylate in improving rheology control of a coating composition while maintaining gloss property of the resulting coating. That is, the gloss of the present coating will be excellent, such as a gloss reading of greater than or equal to 80° as measured by a gloss meter, micro-TRI-gloss (available from BYK, Germany) at 60°, while the rheology of the coating composition of the present invention is well controlled.

DETAILED DESCRIPTION

For purposes of the following detailed description, it is to be understood that the invention may assume various alternative variations and step sequences except where expressly specified to the contrary. Moreover, other than in any operating examples, or where otherwise indicated, all numbers expressing, for example, quantities of ingredients used in the specification and claims, are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. So reference to "a" functional urethane acrylate, "a" photoinitiator, "an" organic solvent, "a" modified functional urethane acrylate, and the like, one or more of these or any other components could be used. In addition, in this application, the use of "or" means "and/or" unless specifically stated otherwise, even though "and/or" may be explicitly used in certain instances.

Functional urethane acrylates are oligomers having urethane backbones with acrylate side chains. The number of functional groups or functionalities on the urethane acrylates depends on the number of acrylate side chains that are attached to the urethane backbone and the number of functional groups on each side chain. As appreciated by those skilled in the art, functional urethane acrylates are generally prepared by reacting a polyol, which could be a polyol copolymer, a polyisocyanate, an acrylate alcohol, a urethane reaction catalyst, and a polymerization inhibitor. A detailed manufacturing method for functional urethane acrylates can be found for example in EP 2322576 A2 to SSCP Co., Ltd., which is hereby incorporated by reference to the extent that it is not in conflict with the scope of the present application.

The functional urethane acrylates used in the present invention can have at least one functionality. As used herein in connection with urethane acrylate, the term "functionality" means the unsaturated site on the chain attached to the urethane backbone, which chain comes from reaction of the acrylate with the components of the backbone. In an embodiment of the present invention, the functional urethane acrylates utilized are one or more selected from functional urethane acrylates having 1 to 20 functional groups, such as 3 to 15. In a particular embodiment of the present invention, the functional urethane acrylates utilized are a mixture of functional urethane acrylate having 3 functionalities and functional urethane acrylate having 15 functionalities.

Functional urethane acrylates which are typically used in the coating industry may have 1 to 100 functionalities. Functional urethane acrylates are also commercially available from many industrial suppliers. Specific examples of the commercially available products of functional urethane acrylates include, but are not limited to, 6103 (an aliphatic urethane hexaacrylate), 6118 (an aliphatic urethane acrylate), 6123 (an aromatic urethane acrylate), 6130B (an aliphatic urethane acrylate having 3 functionalities), all of which are available from ETERNAL CHEMICAL CO., LTD. Further examples of functional urethane acrylates include, but are not limited to, Miramer MU3702 (an aromatic difunctional urethane acrylate), Miramer PU640 (an aromatic hexafunctional urethane acrylate), Miramer SC4240 (an aliphatic difunctional urethane acrylate), Miramer SC3153 (an aliphatic functional urethane acrylate), and Miramer SC2152 (an aliphatic 15-functional urethane acrylate), all of which are available from Miwon Specialty Chemical Co., Ltd.

In one embodiment of the present invention, the functional urethane acrylates are present in the coating composition of the present invention in an amount from 20% by weight to 50% by weight, such as from 20% by weight to 30% by weight, based on the total weight of the composition. When the amount of functional urethane acrylates are within the ranges as cited above, an excellent leveling property of the final coating composition may be achieved. By "leveling property" is meant the ability for a coating composition to smoothly spread into a flat coating.

In a particular embodiment of the present invention, there are two types of functional urethane acrylates used in the coating composition of the present invention, such as any two of those described above. The ratio between the utilized amounts of the two types of functional urethane acrylates can be from 3:1 to 1:3. When the ratio of the two types of functional urethane acrylates is within the range as cited above, the leveling property of the final coating composition may be excellent and a clear and glossy effect may be achieved in the resulting coating. As used herein and appreciated by a person skilled in the art, a "clear and glossy effect" refers to a "transparent and shiny effect" in the resulting coating.

The coating composition of the present invention also comprises one or more of photoinitiators.

As will be appreciated by those skilled in the art, a photoinitiator absorbs ultraviolet radiation and transforms it into a radical that initiates polymerization. Photoinitiators are classified in two major groups based upon a mode of action, either or both of which may be used in the compositions of the present invention. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used in the curable compositions of the present invention include benzil, benzoin, benzoin methyl ether, benzoin isobutyl ether benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, a-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyldiphenylphosphine oxide, and 2,6-dimethoxybenzoyldiphenylphosphine oxide, bisacylphosphine oxides, e.g., bis(2,6-dimethyoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, methyl benzoylformate, and mixtures thereof.

In a particular embodiment, the photoinitiators used in the present invention comprise 1-hydroxycyclohexyl-benzophenone, ethyl 2,4,6-trimethylbenzoyl phosphinate and/or benzophenone.

In certain embodiments, the compositions of the present invention comprise 0.01 to 15 percent by weight of photoinitiator or, in some embodiments, 0.01 to 10 percent by weight, or, in yet other embodiments, 0.01 to 3 percent by weight of photoinitiator based on the total weight of the composition.

The coating composition also comprises one or more of organic solvents. The organic solvents utilized in the coating composition of the present inventions are those commonly known to a person skilled in the art. Specific examples of the organic solvents include, but are not limited to, ethanol, propanol, iso-propanol, butanol, iso-butanol, tert-butanol, methyl acetate, ethyl acetate, ethylene glycol methyl ether, ethylene glycol ethyl ether, ethylene glycol butyl ether, propylene ethylene glycol methyl ether, propylene ethylene glycol ethyl ether, propylene ethylene glycol butyl ether, and petroleum ether.

In some embodiments of the present invention, more than one type of solvent is used in the coating composition of the present invention. The number of types of organic solvents that are used in the present invention and the proportions for each type of the organic solvents can be appropriately selected by those skilled in the art, provided that a desired viscosity of the final coating composition can be obtained. In a particular embodiment of the present invention, at least two types of organic solvents are used in the coating composition of the present invention. In a more specific embodiment of the present invention, five types of the organic solvents can be used in the coating composition of the present invention. In a particular embodiment of the present invention, the organic solvents utilized are tert-butanol, ethyl acetate, iso-propanol, petroleum ether and ethylene glycol butyl ether.

The coating composition of the present invention also comprises a modified functional urethane acrylate oligomer. The modified functional urethane acrylate oligomer can be a solvent modified functional urethane acrylate oligomer. As used herein, the term "solvent modified functional urethane acrylate oligomer" refers to a functional urethane acrylate oligomer wherein the properties, such as viscosity, curability and etc., thereof are modified by solvent(s). The viscosity of such a solvent modified functional urethane acrylate oligomer can be in a range from 5,000 to 7,000 cps at 25° C. Such a solvent modified functional urethane acrylate oligomer may comprise 60% by weight to 80% by weight of UV-reactive resin and 20% by weight to 40% by weight of non-reactive plastic resin. As can be appreciated by a person skilled in the art, a UV-reactive resin is curable under the radiation of UV light, while a non-reactive plastic resin is a thermoplastic resin. In a particular embodiment of the present invention, the solvent modified functional urethane acrylate oligomer can have a weight average molecular weight of 38,000 to 38,500, as measured through a standard Gel Permeation Chromatography known to a person skilled in the art. In a particular embodiment of the present invention, the solvent modified functional urethane acrylate oligomer may comprise 70% by weight of UV-reactive resin and 30% by weight of non-reactive plastic resin. In another embodiment of the present invention, the solvent modified functional urethane acrylate oligomer is a hexafunctional urethane acrylate. The solvents that can be used in the solvent modified functional urethane acrylate include, but are not limited to, ethanol, ethyl acetate, butyl acetate, n-butanol, methyl acrylate, ethyl acrylate, ethyl methacrylate, methyl isobutyl ketone, toluene, xylene, propylene glycol monoethyl ether actate, solvesso 100 and/or solvesso 150.

Some specific commercially available examples of the solvent modified functional urethane acrylate oligomers include, but are not limited to, 6175-1, 6175-2, 6175-3, 6175-6, 6175-1LT, 6176 and 6071, all of which are available from ETERNAL CHEMICAL CO., LTD. These solvent modified functional urethane acrylate oligomers are recommended by ETERNAL CHEMICAL CO., LTD. to be used in a vacuum electro-deposit surfacer for coating a metal substrate. However, the present inventors have surprisingly found that these solvent modified functional urethane acrylate oligomers have special rheology control characteristics in the coating composition of the present invention. In a particular embodiment of the present invention, the solvent modified functional urethane acrylate oligomer is 6175-1, which is a solvent modified hexafunctional urethane acrylate oligomer.

The solvent modified functional urethane acrylate oligomer can, in certain embodiments, be present in the coating composition of the present invention at an amount no more than 20 wt % based on the total weight of the composition. In a particular embodiment of the present invention, the solvent modified functional urethane acrylate oligomer is present in the coating composition of the present invention at an amount ranging from 5 wt % to 11 wt %. When the amount is less than 5 wt %, the desired level of rheology control may not be achieved. When the amount is greater than 11 wt %, the strength of the coating system may be less than desired, as abrasion resistance may be decreased.

The coating composition of the present invention may further comprise a fluorine-containing surface modification agent to make the final coating hydrophobic and/or oleophobic. Such a functional additive can be RS-75, which is available from DIC Japan.

In an embodiment of the present invention, the viscosity of the coating composition of the present invention is 10 to 12 seconds, measured with IWATA #2 Cup @25° C. In another particular embodiment of the present invention, the viscosity of the coating composition of the present invention is 10.7 to 11.3 seconds, measured with IWATA #2 Cup @25° C. The IWATA #2 Cup used in the present invention is a conventional instrument used in the coating industry for measuring viscosity of coating compositions.

The coating composition of the present invention can be applied on a plastic substrate. Such a plastic substrate may be, for example, but not limited to, a casing for a consumer electronic devices, such as a mobile phone, a smart phone, a computer, a tablet computer, a game player, a disc player; a portion of a vehicle such as a vehicular body (e.g., without limitation, door, body panel, trunk deck lid, roof panel, hood, and/or roof) and/or a vehicular frame; interior decorations in a vehicle; and other plastic substrates.

In an embodiment of the present invention, the plastic material comprises polyethylene, polypropylene, polybutylene, polystyrene, polyurethanes, poly(meth)acrylates, polyvinyls, polyamides, polyesters, melamine resins, polyacrylonitrile, polycarbonates, polyvinyl chloride, polyvinyl alcohols, polyvinyl acetates, polyvinylpyrrolidones and/or corresponding copolymers and block copolymers.

As can be appreciated to those person skilled in the art, the coating compositions of the present invention can also comprise any additives standard in the art of coating manufacture including colorants, plasticizers, abrasion-resistant particles, film strengthening particles, flow control agents, thixotropic agents, rheology modifiers, catalysts, antioxidants, biocides, defoamers, surfactants, wetting agents, dispersing aids, adhesion promoters, clays, hindered amine light stabilizers, UV light absorbers and stabilizers, a stabilizing agent, fillers, organic cosolvents, reactive diluents, grind vehicles, and other customary auxiliaries, or combinations thereof.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. A "filler," on the other hand, does not necessarily impart any color and/or opacity and/or other visual effect to the composition.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent- and/or aqueous-based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triaryl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution).

In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at col. 3, line 56 to col. 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. Pat. No. 8,153,344 B2, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion-resistant particle" is one that, when used in a coating, will impart some level of abrasion resistance to the coating as compared with the same coating lacking the particles. Suitable abrasion-resistant particles include organic and/or inorganic particles. Examples of suitable organic particles include, but are not limited to, diamond particles, such as diamond dust particles, and particles formed from carbide materials; examples of carbide particles include, but are not limited to, titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

The unique nature of coatings comprising a film-forming resin and a catalyst associated with a carrier may enable them to be provided and stored as one-component compositions prior to use because some or all of the catalyst can be isolated from reacting until desired upon application of shear force. A one-component composition will be understood as referring to a composition wherein all the coating components are maintained in the same container after manufacture, during storage, etc. A typical one-component coating can be applied to a substrate and cured by any conventional means, such as by heating, forced air, radiation cure and the like. For some coatings, such as ambient cure coatings, it is not practical to store them as a one-component, but rather they must be stored as multi-component coatings to prevent the components from curing prior to use. The term "multi-component coatings" means coatings in which various components are maintained separately until just prior to application. The present coatings can also be multi-component coatings, such as the two-component coatings described in the background section.

The coating composition of the present invention can be made through regular methods known to those skilled in the art. For example, the coating composition can be prepared by adding each component as described above into a vessel and then homogeneously mixing the mixture. It is desirable, in certain embodiments, to mix the one or more of solid photoinitiators first, and then mix the resulting mixture with the other components of the coating composition.

The present invention also relates to a method for forming a coating on a plastic substrate with the coating composition of the present invention, wherein the method comprises:
  (i) applying said coating composition to at least a part of a plastic substrate;
  (ii) adjusting the thickness of the coating applied so that to obtain a dry film thickness of 10 to 25 micrometers;
  (iii) baking the coating; and
  (iv) UV radiating the coating composition at an energy of 700 to 1000 mJ/cm$^2$ and an intensity of 100 to 200 mW/cm$^2$.

In certain embodiments, prior to application to the substrate, a further step of mixing the coating composition of the present invention with a diluent to obtain a diluted coating composition is performed and the diluted coating is applied to the substrate.

The coatings of the present invention can be applied by any means standard in the art, such as electrocoating, spraying, electrostatic spraying, dipping, rolling, brushing, and the like. Before applying the coating, the plastic substrate may be subject to a dedust treatment and/or a degrease treatment. The methods for conducting the dedust treatment and/or the degrease treatment are conventional procedures in the coatings industry and are well known to those persons skilled in the art.

The diluents used in the application methods of the present invention are those conventionally used in the coatings industry. In one embodiment of the present invention, there are one or more diluents used. The specific examples of the diluents that can be used in the applying method of the present invention include, but are not limited to, ketones such as methyl ethyl ketone (MEK), acetone, butylketone, methylisobutyl ketone, cyclopentanone and cyclohexanone, and ketols such as hydroxyl acetone, hydroxyl butanone, hydroxyl cyclohextanone and dodecyl acetone alcohol (DAA). A particularly suitable diluent is a mixture of one diluent selected from ketones and one diluents selected from ketols. Some specific examples of combinations between ketone and ketol include, but are not limited to, acetone and hydroxyl acetone, butylketone and hydroxyl acetone, methyl ethyl ketone and hydroxyl acetone, methyl ethyl ketone and hydroxyl butanone, and methyl ethyl ketone and dodecyl acetone alcohol. The ratio between the ketone and the ketol in the diluents mixture can be 1:3 to 3:1, and in some embodiments of the present invention, 1:2 to 2:1, or 1:1. In a particularly suitable embodiment of the present invention, the diluent mixture comprises exclusively MEK and DAA, and is substantially free, that is, less than 5 wt % of any other diluent; such combination may have an excellent leveling effect on the resulting coating.

In certain embodiments of the present invention, the coating composition of the present invention may be first mixed with one or more diluents known in the coatings art, such as those described above to obtain a viscosity which is suitable for applying the diluted coating composition onto a plastic substrate. Such a viscosity may be, such as, 7 to 10 seconds, as measured with IWATA #2 Cup @25° C., and in particular 8 to 8.5 seconds. IWATA #2 Cup is a conventional instrument used in the art for measuring the viscosity of a coating composition. In certain embodiments, when the viscosity is too low, the flowability of the coating may be decreased, while in yet other embodiments when the viscosity too high, wrinkles may appear on the coat film.

In certain embodiments of the present invention, the coatings composition can be applied to a dry film thickness of 10 to 25 micrometers, such as 13 to 20 micrometers. One skilled in the art will appreciate that if the dry film thickness is too small, the coverage ability of the film may be relatively poor, and spots and wrinkles tend to occur, while if the dry film thickness is too great, the coat film tends to be low in drying properties.

The coating composition of the present invention may be subjected to baking after applying on the plastic substrate until at least a partial cure of the coating occurs. The baking, if carried out, can be conducted at a temperature of 50 to 70° C., such as 55 to 65° C. If carried out, the baking can be conducted for 5 to 10 minutes. If the baking is conducted at a temperature lower than 55° C. and shorter than 5 minutes, an undesirably high level of solvents may be left and the properties of the resulting film may be degraded. On the other hand, if the baking is conducted at a temperature higher than 65° C. and longer than 10 minutes, the coat film may corrode the substrate.

Instead of, or in addition to baking, the coating composition can be subjected to UV radiation. The source and amount of actinic radiation applied to the coating (or coated substrate) may be selected by one skilled in the art based on such factors as, the coating thickness, the coating components, the substrate, and the like. The coating composition can be UV-radiated, for example, at an energy of 700 to 1000 mJ/cm$^2$ and an intensity of 100 to 200 mW/cm$^2$. In certain embodiments, if the UV radiation is conducted at an energy less than 700 mJ/cm$^2$ and an intensity less than 100 mW/cm$^2$, the dry property of the resulting coat film can be lowered, and consequently the properties of the final coating can be decreased, while, on the other hand, if the UV radiation is conducted at an energy greater than 1000 mJ/cm$^2$ and an intensity higher than 200 mW/cm$^2$, the resulting coat film may have less strength and yellowing may occur.

The coating compositions of the present invention can be used alone, which means there is only one coating obtained from the coating composition of the present invention on a plastic substrate. The coating composition of the present invention can also be used in combination with one or more other coatings. For example, the coatings of the present invention can be used as a primer, basecoat, and/or top coat. For substrates coated with multiple coatings, one or more of those coatings can be coatings as described herein.

Illustrating the invention are the following examples that are not to be considered as limiting the invention to their details. All parts and percentages in the examples, as well as throughout the specification, are by weight unless otherwise indicated.

EXAMPLES

Whereas particular embodiments of this invention have been described above for purposes of illustration, it will be evident to those skilled in the art that numerous variations of the details of the present invention may be made without departing from the invention as defined in the appended claims.

The Examples of coating compositions of the present invention and the Comparative Examples of the coating compositions were prepared by uniformly mixing the photoinitiators first in a vessel, and then adding other ingredients of the coating composition and homogeneously mixing the mixture.

The specific ingredients used in the Examples and Comparative Examples are shown in the following Tables I-IV.

TABLE I

Ingredients used in Example 1

| No. | Ingredients | Weight percentage |
|---|---|---|
| 1 | tert-butanol | 12.2 |
| 2 | ethyl acetate | 24 |
| 3 | iso-propanol | 8 |
| 4 | Naphtha 130 | 5.3 |
| 5 | ethylene glycol butyl ether | 10.7 |
| 6 | photoinitiator 184[1] | 1.6 |
| 7 | photoinitiator TPO[2] | 0.2 |
| 8 | photoinitiator BP[3] | 0.6 |
| 9 | 15-functional urethane acrylate SC2152[4] | 20.5 |
| 10 | modified functional urethane acrylate 6175-1[5] | 7.1 |
| 11 | 3-functional urethane acrylate 6130B-80[6] | 7.6 |
| 12 | Fluorine containing surface modification aid RS-75[7] | 2.1 |
| Total amount | | 100 |

[1]photoinitiator 184 is 1-hydroxycyclohexyl-benzophenone, available from Double Bond Chemical Ind. Co., Ltd.;
[2]photoinitiator TPO is ethyl 2,4,6-trimethylbenzoyl phosphinate, available from BASF;
[3]BP is benzophenone, available from Insight High Technology (Jiangsu) Co., Ltd.;
[4]15-functional urethane acrylate SC2152, available from Miwon Specialty Chemical Co., Ltd.
[5]modified functional urethane acrylate 6175-1, available from ETERNAL CHEMICAL CO., LTD.;
[6]3-functional urethane acrylate 6130B-80, available from ETERNAL CHEMICAL CO., LTD.; and
[7]Fluorine containing surface modification aid RS-75, available from DIC Japan.

TABLE II

Ingredients used in Example 2

| No. | Ingredients | Weight percentage |
|---|---|---|
| 1 | TBA[1] | 11.4 |
| 2 | Solvent Blend[2] | 60 |
| 3 | PHOTOINITIATOR 184 | 1 |
| 4 | PHOTOINITIATOR MBF[3] | 1 |

TABLE II-continued

Ingredients used in Example 2

| No. | Ingredients | Weight percentage |
|---|---|---|
| 5 | Miwon 15 functional SC2152 | 13 |
| 6 | Eternal 6175-1 | 5 |
| 7 | DIC Megaface RS-75 | 2 |
| 8 | 6 functional KAYAKU UV oligomer DPCA-60[4] | 14.5 |
| Total amount | | 107.9 |

[1]Tert butanol, available from WEIFANG TEDA CHEMICAL CO LTD.
[2]A mixture of ethyl acetate (50%), 2-butyoxyethanol (22.22%), isopropanol (16.67%) and Naphtha 130 (11.11%)
[3]Methyl benzoylformate, available from BASF
[4]6-functional Caprolactone-modified DIPENTAERYTHRITOL HEXAACRYLATE, available from Nippon KAYAKU Co., Ltd.

TABLE III

Ingredients used in Example 3

| No. | Ingredients | Weight percentage |
|---|---|---|
| 1 | PHOTOINITIATOR184 | 2.22 |
| 2 | DIC Megaface RS-75 | 2 |
| 3 | Miwon 15 functional SC2152 | 12.2 |
| 4 | Eternal 6175-1 | 10.2 |
| 5 | Etenal 3 functional 6130B-80 | 11.4 |
| 6 | 6-functional KAYAKU UV oligomer DPCA-60 | 15.3 |
| 7 | Solvent Blend I[1] | 39.78 |
| 8 | Solvent Blend II[2] | 6.9 |
| Total amount | | 100 |

[1]A mixture of ethyl acetate (50%), 2-butyoxyethanol (22.22%), isopropanol (16.67%) and Naphtha 130 (11.11%); and
[2]A mixture of MEK and DAA at 1:1.

TABLE IV

Ingredients used in Comparative Example 1

| No. | comment | Weight percentage |
|---|---|---|
| 1 | MIRAMER M300[1] | 16.2962963 |
| 2 | OLIGOMER FOR UV CLEARCOAT[2] | 64.53703704 |
| 3 | BYK-UV3500[3] | 0.185185185 |
| 4 | BYK-306[4] | 0.277777778 |
| 5 | BYK-310[5] | 0.462962963 |
| 6 | AFCONA - 3777 FLUOROCARBON[6] | 0.462962963 |
| 7 | PMA[7] | 15.37037037 |
| 8 | IRGACURE 1173[8] | 1.851851852 |
| 9 | IRGACURE 651[9] | 0.555555556 |
| Total amount | | 100 |

[1]M300, trimethylol propane triacrylate, available from Miwon Specialty Chemical Co., Ltd.;
[2]U-0606, Tetrafunctional poly Urethane acrylate, available from Lidye;
[3]BYK UV3500, ACRYLIC FUNCT.POLYDIMETHYLSILOXANE, available from BYK;
[4]BYK-306, MODIFIED POLYSILOXANE POLYMER SOL'N, available from BYK;
[5]BYK-310, POLYESTER MOD. POLYDIETHYLSILOXANE;
[6]AFCONA-3777, Fluorocarbon Modified Polymer, available from AFCONA;
[7]PMA, METHYL ETHER PROPYLENE GLYCOL ACET., available DOW CHEMICAL CO. LTD;
[8]2HYDROXY-2METHYL-1PHENYL-1PROPANONE, available from BASF; and
[9]DIMETHOXY-2,2; PHENYLACETOPHENONE-2, available from BASF.

TABLE V

Ingredients used in Comparative Example 2

| No. | Ingredients | Weight percent |
|---|---|---|
| 1 | tert-Butyl Alcohol | 11.4 |
| 2 | Solvent Blend[1] | 60.0 |
| 3 | IRGACURE 184 | 1.5 |
| 4 | MEGAFACE RS-75 | 2.0 |
| 5 | Miramer SC2152 - 15 functional Aliphatic Urethane Acrylate | 13.0 |
| 6 | U-0740 50%[2] | 4.7 |
| 7 | 6 functional KAYAKU UV oligomer DPCA-60 | 14.5 |
| | Total amount | 107.1 |

[1]A mixture of ethyl acetate (50%), 2-butyoxyethanol (22.22%), isopropanol (16.67%) and Naphtha 130 (11.11%)
[2]UV CURABLE POLYURETHANE ACRYLATE, Lidye Chemical Co., LTD, Taiwan After the above Examples and Comparative Examples were made, each coating composition was mixed with a diluent mixture of MEK and DAA at a ratio of 1:1 to obtain a diluted coating composition each having a viscosity of 8 to 8.5 seconds, measured with IWATA #2 Cup @25° C.

Each coating composition obtained as above was applied onto a plastic substrate by brush coating to obtain a dry film thickness of 13 to 20 micrometers. The dry films were baked in an oven at 60±5° C. for 5 to 10 minutes. After the baking, the films were UV-radiated by a mercury lamp at 100 to 200 mW/cm$^2$ and 700 to 1000 mJ/cm$^2$. The resulted dry films were subjected to gloss test and rheology evaluation.

The gloss test was conducted by a gloss meter, micro-TRI-gloss (available from BYK, Germany) at 60° and the results are ranked as follows:

Good: ≥80°; and
Failed: <80°.

The rheology test was conducted by visual evaluation on the morphology of the final dry film and the results are ranked as follows:

Excellent: Good leveling property without any fat edge;
Good: Good leveling property with a little fat edge effect which does not affect the final use; and
Failed: Poor leveling property and/or significant fat edge effect.

The test results for each Example and Comparative Example are summarized in the following Table VI.

TABLE VI

Test results for Examples (Ex) and Comparative Examples (CE)

| | Ex. 1 | Ex. 2 | Ex. 3 | CE 1 | CE 2 |
|---|---|---|---|---|---|
| Gloss Property | Good | Good | Good | Good | Good |
| Rheology property | Excellent | Good | Good | Failed | Failed |

According to the above Table VI, only the coating compositions of the present invention achieved both excellent (or good) gloss and rheology properties.

Whereas particular embodiments of this invention have been described above for purposes of illustration, it will be evident to those skilled in the art that numerous variations of the details of the present invention may be made without departing from the invention as defined in the appended claims.

We claim:

1. A coating composition comprising:
   (a) a functional urethane acrylate;
   (b) a photoinitiator;
   (c) an organic solvent; and
   (d) a solvent modified functional urethane acrylate oligomer,
   wherein the functional urethane acrylate comprises a urethane acrylate having 3 to 15 functionalities,
   wherein the functional urethane acrylate is present from 20% by weight to 30% by weight, based on the total weight of the coating composition, and
   wherein the solvent modified functional urethane acrylate oligomer is present at no more than 11% by weight, based on the total weight of the coating composition.

2. The coating composition of claim 1, wherein said functional urethane acrylate comprises a urethane acrylate having 3 functionalities and a urethane acrylate having 15 functionalities.

3. The coating composition of claim 1, wherein said photoinitiator comprises 1-hydroxycyclohexyl-benzophenone, ethyl 2,4,6-trimethylbenzoyl phosphinate and/or benzophenone.

4. The coating composition of claim 1, wherein said organic solvent comprises iso-propanol, tert-butanol, ethyl acetate, ethylene glycol butyl ether, and/or petroleum ether.

5. The coating composition of claim 1, wherein said modified functional urethane acrylate comprises 60% by weight to 80% by weight of UV-reactive resin and 20% by weight to 40% by weight of non-reactive plastic resin.

6. The coating composition of claim 1, wherein said solvent modified functional urethane acrylate comprises a solvent modified hexafunctional urethane acrylate.

7. The coating composition of claim 1, wherein said solvent modified functional urethane acrylate is present in the coating composition in an amount from 5 to 11 wt % based on the total weight of the composition.

8. The coating composition of claim 1, wherein said coating composition is for applying on a plastic substrate.

9. The coating composition of claim 8, wherein the plastic substrate comprises polyethylene, polypropylene, polybutylene, polystyrene, polyurethanes, poly(meth)acrylates, polyvinyls, polyamides, polyesters, melamine resins, polyacrylonitrile, polycarbonates, polyvinyl chloride, polyvinyl alcohols, polyvinyl acetates, polyvinylpyrrolidones and/or corresponding copolymers and/or block copolymers.

10. A method for forming a coating on a plastic substrate comprising:
   (a) applying the coating composition of claim 1 to at least a portion of the plastic substrate to obtain a dry film thickness of 10 to 25 micrometers;
   (b) baking the coating composition; and
   (c) UV radiating the coating composition at an energy until at least a partial cure of the coating composition occurs.

11. The method of claim 10, wherein said modified functional urethane acrylate is a solvent modified hexafunctional urethane acrylate.

12. The method of claim 10, comprising the further step of, prior to applying the coating composition to the substrate, mixing said coating composition with diluents to obtain a diluted coating composition.

13. The method of claim 12, wherein said diluted coating composition has a viscosity of 8 to 8.5 seconds, measured with IWATA #2 Cup at 25° C.

14. The method of claim 12, wherein the diluents comprise methyl ethyl ketone and dodecyl acetone alcohol at a ratio of 1:1.

15. The method of claim 10, wherein the baking is conducted at a temperature of 50 to 70° C. for 5 to 10 minutes.

16. The method of claim 10, wherein the UV radiation is conducted at an energy of 700 to 1000 mJ/cm$^2$ and an intensity of 100 to 200 mW/cm$^2$.

17. The method of claim 10, wherein the plastic substrate comprises polyethylene, polypropylene, polybutylene, polystyrene, polyurethanes, poly(meth)acrylates, polyvinyls, polyamides, polyesters, melamine resins, polyacrylonitrile, polycarbonates, polyvinyl chloride, polyvinyl alcohols, polyvinyl acetates, polyvinylpyrrolidones and/or corresponding copolymers and/or block copolymers.

* * * * *